United States Patent [19]
Hatakeyama

[11] Patent Number: 6,113,927
[45] Date of Patent: Sep. 5, 2000

[54] PACKAGE AND PACKAGING METHOD FOR AQUEOUS LIQUID MATERIALS

[75] Inventor: Hidetoshi Hatakeyama, Tokyo, Japan

[73] Assignee: Mitsubishi Gas Chemical Company, Inc., Tokyo, Japan

[21] Appl. No.: 09/000,864

[22] Filed: Dec. 30, 1997

[30] Foreign Application Priority Data

Jan. 6, 1997 [JP] Japan .................................. 9-000315

[51] Int. Cl.⁷ .............................. A61K 7/00; B29D 22/00
[52] U.S. Cl. .......................... 424/401; 424/443; 428/35.9
[58] Field of Search .................................. 424/401, 443; 428/35.9

[56] References Cited

U.S. PATENT DOCUMENTS 4,877,664  10/1989  Maeda et al. .......................... 428/35.9

FOREIGN PATENT DOCUMENTS

| | | |
|---|---|---|
| 0 688 666 | 12/1995 | European Pat. Off. . |
| 63-218075 | 9/1988 | Japan . |
| 6-83340 | 11/1994 | Japan . |
| 7-14874 | 2/1995 | Japan . |
| 7-171194 | 7/1995 | Japan . |
| 88/08694 | 4/1988 | WIPO . |

OTHER PUBLICATIONS

Database Caplus on Stn, An 1997: 481078, Hatakeyama et al, "Oxygen–Absorbing multibased Film and method by Pregning same", EP 781649, Jul. 02, 1997.

*Primary Examiner*—Richard L. Raymond
*Assistant Examiner*—Sudhaker B. Patel
*Attorney, Agent, or Firm*—Nixon Peabody LLP; Thomas W. Cole

[57] ABSTRACT

Provides a packaging method for aqueous liquid materials whereby a molded container in which an aqueous liquid material has been sealed can be packaged simply by sealing it within a packaging container of an oxygen-absorbent multilayer material provided with an oxygen layer, without the addition of moisture, and whereby oxygen present within the packaging container can be removed to maintain the aqueous liquid material in an oxygen-free state. The method involves sealing a polyolefin or vinyl chloride molded container in which an aqueous liquid material has been sealed within an outer packaging container comprising a packaging container of an oxygen-absorbent multilayer material provided with an oxygen-absorbent layer which contains an iron oxygen absorbent with high oxygen absorption capabilities consisting of iron powder coated with a metal halide, and an alkaline earth metal oxide.

11 Claims, 2 Drawing Sheets

PACKAGE AND PACKAGING METHOD FOR AQUEOUS LIQUID MATERIALS

BACKGROUND OF THE INVENTION

1. Field of the Invention

The present invention relates to a package and a packaging method for aqueous liquid materials, and more particularly to a package and a packaging method for aqueous liquid materials wherein a molded container in which an aqueous liquid material has been sealed is sealed within an outer container consisting of an oxygen-absorbent multilayer material. The package and packaging method of the present invention are suitable for the storage of liquid drugs, cosmetics, food products, and other materials whose components are susceptible to oxygen-induced changes. Here, "aqueous liquid materials" is used to mean liquid materials having high water content and high water activity.

2. Description of the Related Art

A conventional method for storing infusion fluids, parenteral solutions, eye drops, oral medication, and other liquid pharmaceutical products, liquid cosmetics, liquid food products, and the like under oxygen-free conditions involves sealing the liquid material in an oxygen-permeable container, and then sealing the sealed container, together with a packet of a deoxidizer, within a bag having gas barrier properties which serves as the outer package. However, due to the nature of liquids themselves, many liquid pharmaceuticals, cosmetics, food products, and other liquids require that the containers in which the liquid will be placed be handled under strict sanitary controls. Conventional methods employing deoxidizer packets have the drawback that is it difficult to maintain sterility of the deoxidizer packets subsequent to sterilization or washing. There is also a risk of the deoxidizer packet being accidentally cut open when sealing the sealed bag which serves as the outer container for the liquid container, causing the liquid container contained therein to be contaminated by the contents of the deoxidizer packet.

Japanese Laid-Open Patent Application 6-83340 discloses an invention which employs in place of a deoxidizer packet an outer packaging bag that has an oxygen-absorbent layer consisting of a deoxidizer dispersed in a thermoplastic resin. However, the oxygen-absorbent layer of the prior art disclosed in this publication has low oxygen absorbing capability, and in order to produce a moisture content sufficient for absorption of oxygen, it is necessary to forcibly induce moisture to permeate into the outer bag from the exterior of the outer bag or the interior of the liquid container through heat sterilization. Accordingly, a heat treatment process was required in order to achieve the desired absorption of oxygen.

Japanese Laid-Open Patent Application 7-171194 discloses a method for introducing the required moisture into a similar outer bag and then enclosing and sealing the liquid container therein. However, the prior art described in this publication has the drawback that the liquid container filled with infusion fluid is wetted by the moisture which has been introduced into the outer bag; this produces an unpleasant sensation when the package is opened for use, and the fact that the package is wet makes it difficult to handle. Further, the moisture introduced into the bag is intended to promote a reaction whereby the oxygen-absorbent layer absorbs oxygen, and reducing the amount of moisture introduced in order to solve the problem noted above causes the rate of oxygen absorption to slow significantly, with the result that considerable time is required to produce an oxygen-free state. During this time, there is a risk of growth of microorganisms nourished, for example, by the glue or similar material used to affix the label to the container, and the outside surface of the liquid container may become soiled by such products. Any attempt to ascertain the minimum water content which will not give rise to such problems requires, in addition to the effort needed to ascertain this level, significant efforts in terms of control of processes such as measuring out the appropriate amounts of water, sanitary controls, and so on.

SUMMARY OF THE INVENTION

It is an object of the present invention to provide a package and a packaging method for maintaining aqueous liquid materials in an oxygen-free state simply by packaging them at room temperature, without requiring heat treatment or any separate addition of moisture.

It is a specific object to provide a package and a packaging method for aqueous liquid materials whereby a molded container in which an aqueous liquid material has been sealed can be packaged simply by sealing it within an outer packaging container of an oxygen-absorbent multilayer material provided with an oxygen-absorbent layer, without the addition of moisture into this outer packaging container.

It is a further object to provide a sanitary and practical package and packaging method for aqueous liquid materials allowing oxygen present within the package to be removed easily so that the aqueous liquid material can be stored in an oxygen-free state.

The inventors found that the oxygen absorbing capabilities of conventional oxygen-absorbent multilayer resin compositions can be significantly improved by dispersing both a highly reactive particulate iron oxygen absorbent and an alkaline earth metal oxide within the resin, and have proposed this method in Japanese Patent Application 7-335034. This proposal makes effective use of the functionality of an alkaline earth metal oxides in terms of preserving the formability of the resin into molded articles and ensuring that the molded article retains oxygen absorbing capabilities while leaving unchanged the high absorbency and oxygen reactivity of the powerful oxygen absorbent.

As a result of extensive research conducted with the goal of developing this technique, the inventors found a technique whereby the small quantities of moisture which permeate the liquid container wall can be utilized effectively for promoting oxygen absorption, and thereby perfected the present invention.

The aqueous liquid material package which pertains to the present invention comprises a gas-permeable, moisture-permeable molded container in which the aqueous liquid material is sealed, and a packaging container of an oxygen-absorbent multilayer material which comprises an oxygen-absorbent layer A consisting of a particulate iron oxygen absorbent and an alkaline earth metal oxide dispersed within a thermoplastic resin and at least a sealant resin layer B disposed on the inside of the oxygen-absorbent layer A and a gas barrier layer C disposed on the outside of the oxygen-absorbent layer A, the permeable molded container in which the aqueous liquid material has been sealed being sealed within the packaging container without introducing any additional moisture.

The packaging method for aqueous liquid materials which pertains to the present invention comprises a step in which an aqueous liquid material is sealed within a gas-permeable, moisture-permeable molded container, and a step in which the permeable molded container in which the aqueous liquid material has been sealed is sealed, without the addition of any additional moisture, within a packaging container of an oxygen-absorbent multilayer material which comprises an oxygen-absorbent layer A consisting of a particulate iron oxygen absorbent and an alkaline earth metal oxide dispersed within a thermoplastic resin and at least a sealant resin layer B disposed on the inside of the oxygen-absorbent layer A and a gas barrier layer C disposed on the outside of the oxygen-absorbent layer A.

The molded container which pertains to the present invention can be fabricated from a polyolefin or vinyl chloride.

The oxygen-absorbent layer A provided to the oxygen-absorbent multilayer material contains a particulate iron oxygen absorbent and an alkaline earth metal oxide. In terms of the oxygen-absorbent layer A exhibiting the desired oxygen-absorbing capability, it is favorable for the particulate iron oxygen absorbent to consist of an iron powder coated with a metal halide, and for the metallic iron content of this iron powder to be 95% or higher.

In the method which pertains to the present invention, the molded container in which the aqueous liquid material is sealed is packaged by sealing it inside an outer packaging container of an oxygen-absorbent multilayer material which comprises the aforementioned oxygen-absorbent layer A and at least a sealant resin layer B disposed on the inside of the oxygen-absorbent layer A and a gas barrier layer C disposed on the outside of the oxygen-absorbent layer A. The outer packaging container is provided with oxygen-absorbing capability by fabricating it from an oxygen-absorbent multilayer material having an oxygen-absorbent layer A; the entire packaging container can be fabricated from this oxygen-absorbent multilayer material, or from a gas barrier multilayer material comprising an oxygen-absorbent multilayer material and a sealant layer. The packaging container form can be a bag container, tray, cup, blister pack, or similar molded container.

In accordance with the present invention, it is preferable for the aqueous liquid material to be sealed within a molded container of a polyolefin or vinyl chloride. In order that the aqueous component of the aqueous liquid material be capable of readily permeating the wall of the inner molded container to reach the oxygen-absorbent layer A of the outer packaging container so that the oxygen-absorbing capability of the oxygen-absorbent layer A can be exhibited, it is favorable for the water activity of the aqueous liquid material to be 0.7 or higher, and preferably 0.8 or higher. The requirements for the aqueous liquid material are merely a high water content and water activity within the range specified above; the material is not limited to a liquid of solution form, but may also include emulsions, creams, and semiliquids containing particles of a solid.

The aqueous liquid material can be any liquid material which is susceptible to undesirable changes in the presence of oxygen (oxidative deterioration, a decline in potency, and so on). Specific examples are infusion fluids, injection solutions, eye drops, medications for internal use, medications for external use, and other liquid pharmaceutical products; cosmetic lotions, perfumes, cosmetic creams, and other cosmetic products; and nutritional supplement drinks, soft drinks, fine beverages, fruit juices, liquid seasonings, liquid flavorings for stews and pickles, and other liquid food products.

In accordance with the present invention, it is necessary that water vapor and oxygen be able to permeate through the walls of the polyolefin or polyvinyl chloride molded container in which the aqueous liquid material is sealed. The water vapor permeability of the molded container should be 0.3 g/m$^2$·day (23° C., 90% RH) or above, and the oxygen permeability should be 100 cc/m$^2$·atm·day (23° C., 90% RH) or above.

Particulate oxygen absorbents comprising metal halide-coated highly active iron powders exhibit significantly higher absorption of moisture and oxygen than do conventional oxygen absorbents intended to be blended with resins; due to the effects of the alkaline earth metal oxide, they nonetheless produce no adverse effect on the molding of various resins, allowing them to be molded into packaging containers. Moreover, they experience no deterioration in ability to absorb moisture and oxygen, and are therefore capable of being readily activated by small quantities of moisture which permeate the liquid container walls and evaporate, allowing any oxygen present within the outer packaging container to be rapidly absorbed and removed.

Moisture from the aqueous liquid material of high water activity which is sealed within the water vapor-permeable molded container is transmitted through the molded container and evaporates within the outer packaging container. In accordance with the present invention, the oxygen-absorbent layer A of the oxygen-absorbent material which constitutes the outer packaging container consists of a layer of a resin composition that contains a metal halide-coated particulate iron oxygen absorbent and an alkaline earth metal oxide, and is thereby endowed with high oxygen absorbing capability; thus, the oxygen-absorbent layer A is readily activated by even such small quantities of evaporating moisture, allowing oxygen present within the outer packaging container to be rapidly absorbed and removed. Accordingly, there is absolutely no need to introduce water into the packaging container in order to promote oxygen absorption by the oxygen-absorbent layer A of the packaging container during packaging of the molded container in which the aqueous liquid material is sealed.

The excellent oxygen absorbing capability of the oxygen-absorbent layer A not only allows it to absorb and remove within a short period any oxygen present within the outer packaging container, but also to absorb, via the wall of the inner molded container, oxygen present in spaces within the inner molded container, as well as dissolved oxygen present in the aqueous liquid material.

DESCRIPTION OF THE PREFERRED EMBODIMENTS

The present invention will be described in further detail below.

Figure 1:
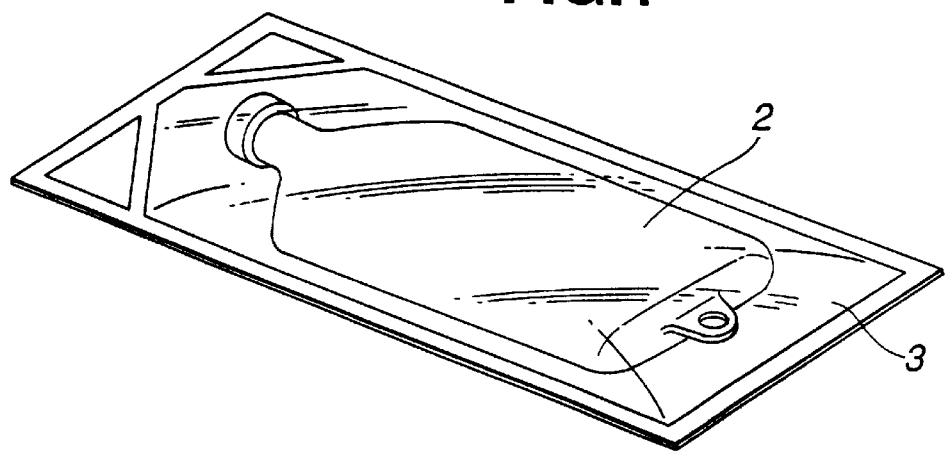
FIG. 1 is a perspective view of the aqueous liquid material package which pertains to the present invention.
Figure 2:
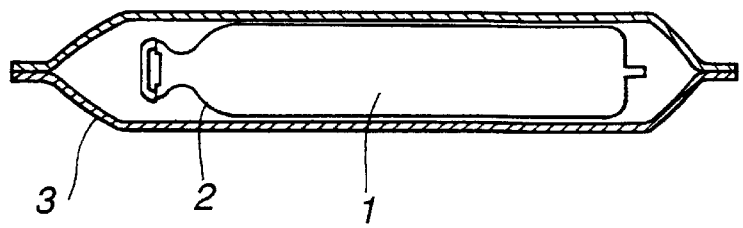
FIG. 2 is a sectional view of the FIG. 1.

As shown FIGS. 1 and 2, the container which packages the aqueous liquid material 1 is a sealable molded container 2 fabricated from a resin. Various types of resin may be used for the container; it is, however, necessary for the inner container to be permeable to water vapor and oxygen. The oxygen permeability under conditions of 25° C., 90% RH should be 100 cc/m$^2$·atm·day or above; the water vapor permeability should be 0.3 g/m$^2$·day or above.

Materials favorable for use as the material for the inner container are polyethylene, polypropylene, polymethyl pentene, and other polyolefins, as well as vinyl chloride. Safety and hygiene considerations dictate that there be substantially no elution of components of the material into the aqueous liquid material. When sealing the aqueous liquid material 1 within the molded container 2, it is desirable to either fill the container 2 to capacity with the aqueous liquid material 1 such that no space is left within the molded container 2, or to replace the atmosphere of any space left within the molded container 2 with nitrogen gas, carbon dioxide gas, water vapor, or the like in order to minimize the residual oxygen content.

The oxygen-absorbent multilayer material used for the outer packaging container 3 is a multilayer material which comprises an oxygen-absorbent layer A consisting of a particulate iron oxygen absorbent and an alkaline earth metal oxide dispersed within a thermoplastic resin, and at least a sealant resin layer B disposed on the inside of the oxygen-absorbent layer A and a gas barrier layer C disposed on the outside of the oxygen-absorbent layer A. The multilayer material may take the form of a film or sheet.

The particulate iron oxygen absorbent contained in the oxygen-absorbent layer A consists principally of an iron powder, and contains a metal halide as an oxygen absorption promotor.

The iron powder may consist, for example, of a sprayed iron powder, sponge iron powder, electrolytic iron powder, ground iron powder, or milled iron powder. Oxygen, silicon, and other impurities should be kept to a minimum. The metallic iron content of the iron powder should by 95 wt % or above, and preferably 98 wt % or above. Research conducted by the inventors indicates that it is metallic iron that effectively contributes to the oxygen absorption reaction. The metallic iron surfaces are transformed into iron oxide through the catalytic action of the metal halide, whereby oxygen is absorbed. Iron oxide has a significantly higher volume than the equimolar amount of metallic iron; thus, the iron oxide which forms tends to push out from the surface while producing new fissures, in a manner analogous to the opening of rose bud, or to the flow and subsequent solidification of lava emitted from the vent of a volcano, repeatedly exposing new metallic iron surfaces at the fissures and allowing oxidation to proceed. In iron powders which contain large amounts of iron oxide and silicon oxide impurities, this process of dynamic iron oxide growth and fissure formation is impaired. Thus, the amount of oxygen and silicon contained in the metal powder should not exceed 2 wt %, and a preferably not exceed 0.5 wt %, for either element.

In processing the oxygen absorbent, it is optionally possible to conduct an oxidation treatment on the surfaces of the low-impurity iron powder exclusively. This has the effect of increasing surface area and promoting subsequent absorption of oxygen, and does not cause any of the problems cited earlier. The oxidation treatment should be conducted within the range 5 wt % or less versus pure iron weight.

The iron powder particle size should be selected within the range 1 to 50 $\mu$m average particle size. Favorable metal halides are alkali metal or alkaline earth metal chlorides, bromides, and iodides; alkali metal and alkaline earth metal chlorides are particularly favorable. In the present invention, it is preferable from the standpoint of oxygen absorbing capability to prepare the particulate iron oxygen absorbent by blending the iron powder with a metal halide aqueous solution and then drying the product to remove moisture, affording an iron powder whose surfaces are coated with the metal halide.

Favorable examples of alkaline earth metal oxides are calcium oxide and magnesium oxide. The alkaline earth metal oxide preferably takes the form of a powder with a particle size approximately equal to or finer than that of the particulate oxygen absorbent. While the alkaline earth metal oxide has no direct effect on the oxygen absorbing capability of the oxygen-absorbent layer A, it facilitates the lamination process for assembling the oxygen-absorbent multilayer material, as well as maintaining the oxygen absorbing capability of the oxygen-absorbent layer A at a high level and enhancing the storage properties of the oxygen-absorbent multilayer material; accordingly, it is necessary to add this compound.

Favorable examples of the thermoplastic resin used for the oxygen-absorbent layer A are those with good oxygen permeability, such as polyethylene, polypropylene, polybutene, polymethyl pentene, polystyrene, and other polyolefins, modified forms thereof, EVA, EMMA, EAA, EPA, and other ethylene copolymers and ionomers. These resins may be used individually or in some suitable blend. The oxygen-absorbent layer A may contain, in addition to the particulate iron oxygen absorbent and the alkaline earth metal oxide, activated carbon, molecular sieves, and other deodorizers, titanium oxide pigment and other coloring agents, or various other types of additive.

Any of the oxygen permeable resins used for the oxygen-absorbent layer A can also be employed as the resin used for the sealant layer B. Selection should be made taking into account the heat sealing properties, peeling properties, and ability to be thermally bonded to the oxygen-absorbent layer A. The sealant layer B may also contain titanium oxide pigment and other additives in amount such that oxygen permeability and thermally bonding properties are not adversely affected.

Favorable examples of materials for the gas barrier layer C are aluminum foil and other metal foils; resin films on which aluminum, aluminum oxide, silicon oxide, or other metal or metal oxide has been deposited; MX nylon and other nylons; and ethylene-vinyl alcohol copolymer, polyvinylidene chloride, and other gas barrier films. The material can be optionally drawn or composited through lamination with other resins or by other means as long as the gas barrier properties are not adversely affected.

The oxygen-absorbent multilayer material can be produced through co-extrusion of the oxygen-absorbent layer A, the sealant layer B, and the gas barrier layer C, by lamination thereof, of by some other known assembly method. Optionally, additional separate layers can be incorporated into the assembly for strength retention, adhesion, surface flatness, or other purposes. However, it is necessary that the oxygen-absorbent multilayer material have the oxygen-absorbent layer A as a middle layer, with the sealant layer B disposed to the outside of and directly proximate to layer A, and the gas barrier layer C disposed to the other side of layer A. Naturally, when forming a packaging container, the oxygen-absorbent multilayer material is disposed with the sealant layer B side facing towards the container interior.

It is not necessary for the outer packaging container to consist in its entirety of an oxygen-absorbent multilayer material; a container consisting of a oxygen-absorbent multilayer material and a gas barrier multilayer material provided with a sealant layer is also permissible. Such a gas barrier multilayer material would be provided on at least its outside surface with a sealant layer; the gas barrier layer and sealant layer of the gas barrier multilayer material may be identical to or different than the gas barrier layer C and sealant layer B of the oxygen-absorbent multilayer material. The fact that the oxygen-absorbent multilayer material and the gas barrier multilayer material are each provided with a sealant layer makes it possible to effect container formation and sealing through heat sealing.

Examples of preferred forms of the outer packaging container are given below. The packaging container must be designed such that those portions consisting of the oxygen-absorbent multilayer material have oxygen absorbing capability sufficient to prevent the storage properties of the aqueous liquid material from being adversely affected.

(1) A sealable bag consisting entirely of an oxygen-absorbent multilayer material of film form.

(2) A sealable bag consisting on one side of an oxygen-absorbent multilayer material film and on the other side of a gas barrier multilayer material film.

(3) A sealable container comprising a molded container (for example, a tray, cup, or blister pack) of a gas barrier multilayer material and a lid member of an oxygen-absorbent multilayer material film.

(4) A sealable container comprising a molded container (for example, a tray, cup, or blister pack) of an oxygen-absorbent multilayer material and a lid member of a gas barrier multilayer material film.

Embodiment 1

Tunnel kiln-reduced iron powder (abbreviated as iron powder I) consisting of at least 98% metallic iron, containing no more than 0.5% silicon impurities, and having an average particle size of 25 $\mu$m was used as the iron powder. The iron powder was placed in a stirred vacuum drying mixer equipped with a heated jacket; a calcium chloride solution was then added. The product was then dried to produce an iron powder coated with calcium chloride (oxygen absorbent I). Using a vented twin-screw extruder, low-density polyethylene (LDPE; MI (melt flow index) =9), oxygen absorbent I, and calcium oxide (average particle size 20 $\mu$m) were combined in a 59:40:1 ratio by weight and extruded into strands. The product was cooled and cut to produce compound I.

Figure 3:
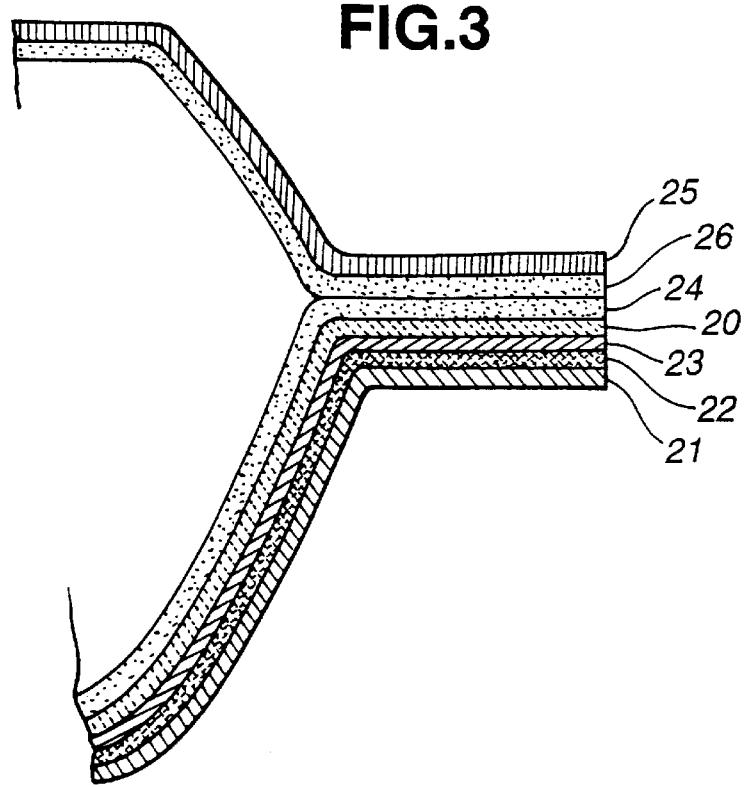
FIG. 3 is a partially enlarged view of FIG. 2.
Figure 4:
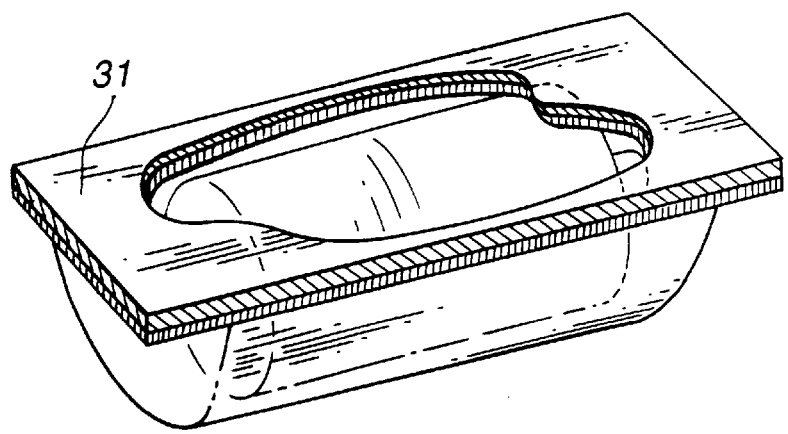
FIG. 4 is a perspective view of the other aqueous liquid material package which pertains to the present invention.
Figure 5:
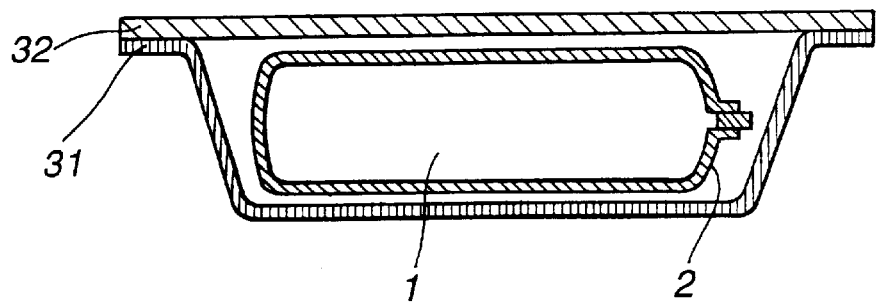
FIG. 5 is a sectional view of the FIG. 4.
Figure 6:
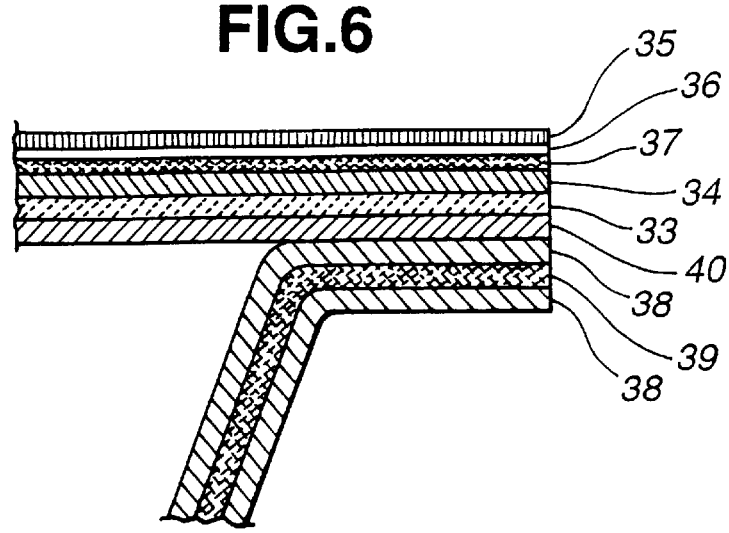
FIG. 6 is a partially enlarged view of FIG. 5.

As shown FIG. 3, using a dry laminator, aluminum foil 22 (9 $\mu$m thickness) was laminated to drawn polypropylene film 21 (20 $\mu$m thickness) with a urethane adhesive to produce a base film I. Next, using a tandem extrusion laminator, the LDPE 23 (MI=8; 20 $\mu$m thick) from the first extruder was extruded onto the aluminum foil 22 side of the base film I. Next, from the second extruder, the compound I is extruded between the LDPE laminated on the base film and a newly fed white LLDPE film (30 $\mu$m thick) to produce an oxygen-absorbent multilayer material I of film form comprising of an oxygen-absorbent layer A consisting of compound I, a gas barrier layer C consisting of aluminum foil, and a sealant layer B consisting of white LLDPE.

Separately, a gas barrier composite nylon film 25 of nylon-6 and MX nylon (Yuniasuron, manufactured by Idemitsu Seikiyu Kagaku KK; 15 $\mu$m thick) was provided with an LLDPE layer 26 (50 $\mu$m thick) laminated thereto to produce a transparent gas barrier film I.

The sealant layers of the oxygen-absorbent multilayer material I of film form and the gas barrier film I were heat sealed together at the perimeter to produce a four-sided sealed bag I (18 cm×25 cm) with the oxygen-absorbent multilayer material I disposed on one side and the transparent gas barrier film disposed on the other.

Under a nitrogen atmosphere, blow molded polypropylene bottles of flattened shape (250 ml capacity) were filled with 200 ml of electrolyte aqueous solutions containing different electrolytes in differing concentrations and having prescribed levels water activity (AW); (the residual oxygen concentration in the sealed bottles was 0.1–0.2%). Each bottle was placed in a four-sided sealed bag I and sealed therein under a mixed gas atmosphere (nitrogen gas/carbon dioxide gas=1/1). The oxygen concentration within each bag as-sealed ranged from 1.9 to 2.1%. The four-sided sealed bags containing sealed bottles of electrolytes with different AW levels were stored at 25° C.; during this time, the oxygen concentration within each four-sided sealed bag was monitored on a daily basis using a gas chromatograph. Results are presented in Table 1.

As the results in Table 1 clearly show, the interiors of the four-sided sealed bags were maintained in a oxygen-free state in the short term, and the oxygen-free state was maintained even after two months. Where the AW of the electrolyte aqueous solution was 0.7 or above, the rate of oxygen absorption was virtually unaffected by the AW; where it was 0.6 or below, a slowing of the absorption rate was noted. Analysis by gas chromatography and analysis by dissolved oxygen meter respectively indicated that an oxygen concentration within a four-sided sealed bag of 0.1% or below was associated with an oxygen concentration of 0.1% or below within the blow molded bottle containing the electrolyte aqueous solution, and with a dissolved oxygen concentration within the electrolyte aqueous solution of 1 ppm or lower.

TABLE 1

| | Aqueous solution AW | Oxygen concentration in four-sided sealed bag (%) | | | | |
|---|---|---|---|---|---|---|
| | Electrolyte type | Start | 10 days | 20 days | 30 days | 60 days |
| Embodiment 1 | 1.00 (none) | 2.04 | 0.07 | <0.01 | <0.01 | <0.01 |
| | 0.95 (NaCl) | 2.08 | 0.06 | <0.01 | <0.01 | <0.01 |
| | 0.82 ($CaCl_2$) | 1.98 | 0.07 | <0.01 | <0.01 | <0.01 |
| | 0.75 (NaCl) | 1.96 | 0.08 | <0.01 | <0.01 | <0.01 |
| | 0.60 ($CaCl_2$) | 2.05 | 0.40 | 0.07 | 0.01 | <0.01 |
| | 0.50 ($CaCl_2$) | 1.94 | 0.87 | 0.32 | 0.03 | <0.01 |
| Embodiment 2 | 1.00 (none) | 2.05 | 0.17 | 0.01 | <0.01 | <0.01 |
| | 0.95 (NaCl) | 1.93 | 0.14 | <0.01 | <0.01 | <0.01 |
| | 0.82 ($CaCl_2$) | 1.94 | 0.15 | 0.02 | <0.01 | <0.01 |
| | 0.75 (NaCl) | 2.02 | 0.17 | 0.02 | <0.01 | <0.01 |
| | 0.60 ($CaCl_2$) | 1.98 | 0.54 | 0.16 | 0.33 | <0.01 |
| | 0.50 ($CaCl_2$) | 2.00 | 1.03 | 0.44 | 0.18 | <0.01 |
| Comparative Example 1 | 1.00 (none) | 1.96 | 1.90 | 1.96 | 2.02 | 2.08 |
| | 0.95 (NaCl) | 1.92 | 1.87 | 1.93 | 1.98 | 2.04 |
| | 0.82 ($CaCl_2$) | 2.04 | 2.02 | 2.03 | 2.08 | 2.14 |
| | 0.75 (NaCl) | 2.00 | 1.96 | 1.99 | 2.02 | 2.10 |
| | 0.60 ($CaCl_2$) | 1.95 | 1.90 | 1.94 | 1.97 | 2.00 |
| | 0.50 ($CaCl_2$) | 1.95 | 1.91 | 1.93 | 1.95 | 2.02 |

Embodiment 2

Oxygen absorption tests were conducted on packages of electrolyte aqueous solution prepared analogously to Embodiment 1 but using a crude reduced iron powder (average particle size 20 $\mu$m) having a total iron content of 92% and containing 82% metallic iron and 1% silicon (this iron powder is designated as iron powder II) as the iron powder. The results are presented in Table 1. While the rate of oxygen absorption of iron powder II in Embodiment 2 was somewhat slower than that of iron powder I in Embodiment 1, it proved possible to maintain the bag interiors in an oxygen-free state.

Comparative Example 1

Oxygen absorption tests were conducted on packages of electrolyte aqueous solution prepared analogously to Embodiment 1 but using unmodified reduced iron powder (the tunnel kiln-reduced iron powder of Embodiment 1 (iron powder I) without the calcium chloride coating). The results are presented in Table 1.

Embodiment 3

As shown 4, 5 and 6, using a tandem extrusion laminator, a lid material 32 for blister packs 31 was prepared by fabricating a three-layer film comprising an LDPE film 40 (25 µm thick), an oxygen-absorbent layer A 33 (40 µm thick) consisting of compound I, and a sealant layer B 34 (30 µm thick) consisting of an ethylene-vinyl acetate copolymer (EVA) mixture LDPE. The aluminum foil side of a composite film (gas barrier layer C) consisting of PET 35 (12 µm thick) and aluminum foil 37 (20 µm thick) and printed on its back face was dry laminated to the LDPE film side of the three-layer film to produce oxygen-absorbent multilayer material II of film form. A polypropylene/ethylene-vinyl alcohol copolymer/polypropylene three-layer sheet (400 µm thick) was prepared for use as a blister pack gas barrier multilayer material.

Using a blow molding/packing machine, cylindrical polyethylene containers (1 cm diameter×5 cm length) were each filled with 3.9 ml sterile contact lens solution (water activity 0.95) under a nitrogen atmosphere, and sealed. Next, the three-layer sheet was formed through vacuum molding into blister packs just large enough to accommodate the cylindrical containers. The cylindrical containers in which the sterile contact lens solution had been sealed were placed within the blister packs and heat sealed using the oxygen-absorbent multilayer material II of film form as a covering material to produce easy-open sealed packages.

The blister packs of the cylindrical containers in which the sterile contact lens solution had been sealed were stored at 25° C. After one week, the oxygen concentration within the sealed blister packs was measured using a gas chromatograph and found to be 0.1% or lower. With storage for an additional six months at 25° C., the oxygen concentration within the sealed blister packs was maintained at 0.1% or lower, and there was no deterioration in the product quality of the sterile contact lens solution.

COMPARATIVE EXAMPLE 2

A sterile contact lens solution package storage test was conducted analogously to Practical Example 3, with the exception that a multilayer material without an oxygen-absorbent layer A and consisting of PET (12 µm thick), aluminum foil (20 µm thick), LDPE (25 µm thick), and EVA mixture LDPE (30 µm thick) was used as the lid material After storage for six months, the oxygen concentration within the sealed blister packs was 20.2%, and the sterile contact lens solution in the inner containers had discolored to light brown, indicative of changes in its components.

The outer container which pertains to the present invention is provided with an oxygen-absorbent multilayer material that is capable of absorbing hydrogen sulfide, and thus can be used to package infusion fluids which contain cysteine, cystine, or other sulfur-containing amino acids and which do not contain sulfites or the like as stabilizers; when opened, such packages do not emit the unpleasant smell characteristic of hydrogen sulfide.

The number of sealed containers of aqueous liquid material accommodated in the outer container is not limited to one; a plurality of containers can be packaged together as a unit.

In accordance with the method which pertains to the present invention, when packaging in a packaging container a molded container that is filled with an aqueous liquid material, there is no need to place a deoxidizer packet in this outer container in order for the molded container to be maintained in an oxygen-free state, as with conventional outer containers. Where the outer packaging comprises a packaging container with an oxygen absorbing function, the need to introduce water into the packaging container in order to promote absorption of oxygen is obviated, as is the need for heat treatments such as retort treatment. Thus, the aqueous liquid material in the inner package can be packaged in an outer package in a simple manner, and the inner container is not wet when the product is opened for use, making it sanitary. Accordingly, aqueous liquid materials which are susceptible to oxygen-induced changes in components can be stored for long periods in a simple and safe manner.

Further, in accordance with the method which pertains to the present invention, the outer packaging container is endowed with excellent oxygen absorbing capability such that, in the short term, oxygen present within the container can be absorbed even if the residual oxygen concentration within the outer package has not been reduced through gas exchange, allowing the package interior to be maintained in an oxygen-free state. The method which pertains to the present invention can be used to store amino acid infusion fluids, fat emulsion infusion fluids, and other liquid pharmaceutical products which contain active ingredients or nutrient components; cosmetics which are susceptible to changes in product quality due to the absence of preservatives; and various types of food products, beverages, and a wide variety of other aqueous liquid materials under oxygen-free conditions.

What is claimed is:

1. An aqueous liquid material package, comprising:
   an inner gas-permeable, moisture-permeable molded container formed from one of the group consisting of polyolefin and polyvinyl chloride and having a water vapor permeability of at least 0.3 g/m$^2$ per day and an oxygen permeability of at least 100 cc/m$^2$ atm per day at 23° C. and 90% relative humidity in which aqueous liquid material having a water activity of at least 0.7 is packed; and
   an outer packaging container including an oxygen-absorbing multilayer material having an oxygen-absorbent layer A including a thermoplastic resin containing an iron oxygen absorbent comprising a particulate iron powder coated with metal halide and an alkaline earth metal oxide, a sealant resin layer B disposed on the inside of the oxygen-absorbent layer A, and a gas barrier layer C disposed on the outside of the oxygen-absorbent layer A, wherein said outer container is sealed containing said inner container without adding moisture.

2. An aqueous liquid material package as defined in claim 1, wherein said particulate iron contains silicon in the amount of not more than 2 wt %.

3. A packaging method for aqueous liquid materials, comprising:
   a step in which an aqueous liquid material having a water activity of at least 0.7 is sealed within a gas-permeable, moisture-permeable molded container formed from one of the group consisting of polyolefin and polyvinyl chloride and having a water permeability of at least 0.3 g/m$^2$ per day and an oxygen permeability of at least 100 cc/m$^2$ at 23° C. 90% relative humidity; and a step in which said molded container is sealed, without adding moisture, within an outer packaging container having an oxygen-absorbing multilayer material which comprises an oxygen-absorbing multilayer A including
   a thermoplastic resin containing an iron oxygen absorbent comprising a particulate iron powder coated with metal halide and an alkaline earth metal oxide, a sealant resin layer B disposed on the inside of the oxygen-absorbent layer A, and a gas barrier layer C disposed on the outside of the oxygen-absorbent layer A.

4. A packaging method for aqueous liquid materials as defined in claim 3, wherein said particulate iron contains silicon in the amount of not more than 2 wt %.

5. An aqueous liquid material package as defined in claim 1, wherein said particulate iron oxygen absorbent consists of an iron powder coated with a metal halide.

6. An aqueous liquid material package as defined in claim 1, wherein the metallic iron content of said iron powder is 95 wt % or above.

7. An aqueous liquid material package as defined in claim 1, wherein the metallic iron content of said iron powder is 98 wt % or above.

8. An aqueous liquid material package as defined in claim 1, said aqueous liquid material is a pharmaceutical product, cosmetic product, or food product.

9. A packaging method for aqueous liquid materials as defined in claim 3, wherein the metallic iron content of said iron powder is 95 wt % or above.

10. A packaging method for aqueous liquid materials as defined in claim 3, wherein the metallic iron content of said iron powder is 98 wt % or above.

11. A packaging method for aqueous liquid materials as defined in claim 3, said aqueous liquid material is a pharmaceutical product, cosmetic product, or for product.

* * * * *